(12) United States Patent
Bonanno et al.

(10) Patent No.: US 10,346,172 B2
(45) Date of Patent: Jul. 9, 2019

(54) CACHING OF PERCEPTRON BRANCH PATTERNS USING TERNARY CONTENT ADDRESSABLE MEMORY BASED ON A MOST INFLUENTIAL BIT LOCATION IN A BRANCH HISTORY VECTOR

(71) Applicant: INTERNATIONAL BUSINESS MACHINES CORPORATION, Armonk, NY (US)

(72) Inventors: James J. Bonanno, Wappingers Falls, NY (US); Brian R. Prasky, Campbell Hall, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 167 days.

(21) Appl. No.: 15/405,402

(22) Filed: Jan. 13, 2017

(65) Prior Publication Data

US 2018/0203704 A1    Jul. 19, 2018

(51) Int. Cl.
*G06F 9/38* (2018.01)
*G06F 12/0875* (2016.01)

(52) U.S. Cl.
CPC .......... *G06F 9/3844* (2013.01); *G06F 9/3867* (2013.01); *G06F 12/0875* (2013.01); *G06F 2212/452* (2013.01)

(58) Field of Classification Search
CPC .. G06F 9/3844; G06F 9/3867; G06F 12/0875; G06F 12/0864; G06F 2212/452

(Continued)

(56) References Cited

U.S. PATENT DOCUMENTS 6,988,189 B1 *  1/2006  O'Connor ........... G06F 9/30021
                                                        712/235
2003/0023825 A1    1/2003  Woo et al.
(Continued)

OTHER PUBLICATIONS

Jimenez, JA et al. Neural Methods for Dynamic Branch Prediction. ACM Transactions on Computer Systems, vol. 20, No. 4, Nov. 2002, pp. 369-397 [online], [retrieved on Aug. 9, 2018]. Retrieved from the Internet <URL: https://dl.acm.org/citation.cfm?id=571639><DOI: 10.1145/571637.571639>.*

*Primary Examiner* — Aimee Li
*Assistant Examiner* — Shawn Doman
(74) *Attorney, Agent, or Firm* — Cantor Colburn LLP; William Kinnaman

(57) ABSTRACT

Embodiments include a technique for caching of perceptron branch patterns using ternary content addressable memory. The technique includes defining a table of perceptrons, each perceptron having a plurality of weights with each weight being associated with a bit location in a history vector, and defining a TCAM, the TCAM having a number of entries, wherein each entry includes a number of bit pairs, the number of bit pairs being equal to a number of weights for each associated perceptron. The technique also includes associating the TCAM with an array of x-bit saturating counters, and performing a branch prediction for a history vector of a given branch, the branch prediction indicating a perceptron prediction. The technique includes determining a most influential bit location in the history vector, the most influential bit location having a greatest weight of an associated perceptron.

17 Claims, 7 Drawing Sheets

(58) Field of Classification Search
USPC .......................................................... 712/240
See application file for complete search history.

(56) References Cited

U.S. PATENT DOCUMENTS

| | | |
|---|---|---|
| 2011/0320918 A1 | 12/2011 | Alves et al. |
| 2013/0191682 A1 | 7/2013 | Gower et al. |
| 2015/0143199 A1 | 5/2015 | Chinnakkonda Vidyapoornachary et al. |
| 2015/0363204 A1* | 12/2015 | Bonanno ............... G06F 9/3806 712/240 |

* cited by examiner

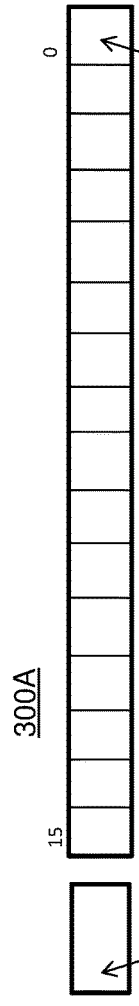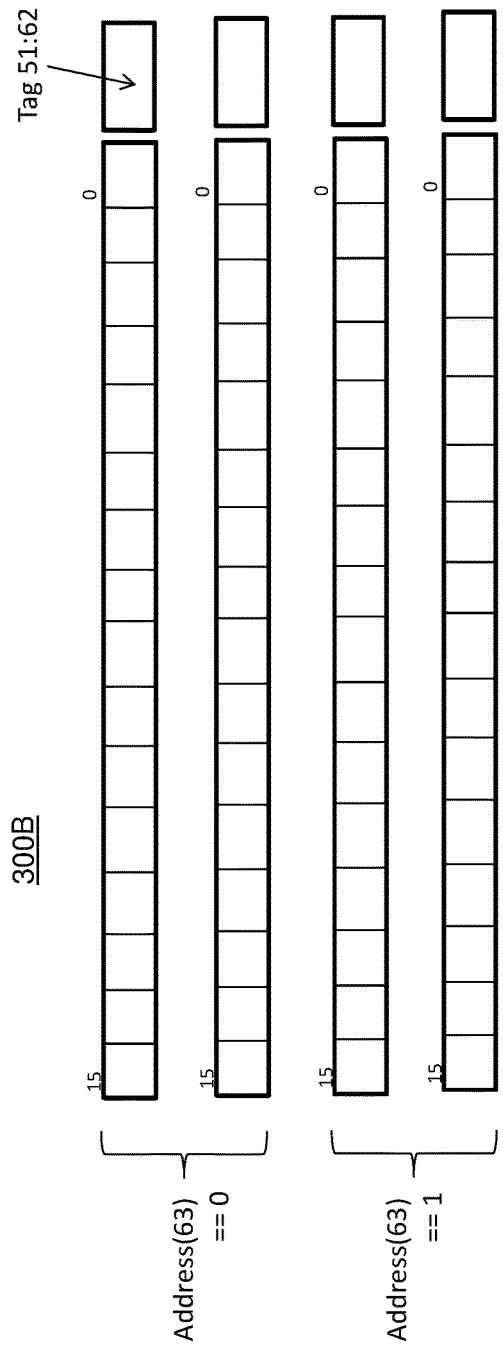
FIG. 3A
FIG. 3B

CACHING OF PERCEPTRON BRANCH PATTERNS USING TERNARY CONTENT ADDRESSABLE MEMORY BASED ON A MOST INFLUENTIAL BIT LOCATION IN A BRANCH HISTORY VECTOR

BACKGROUND

The present invention relates to computer processing systems, and more specifically, to caching of perceptron branch patterns using ternary content addressable memory.

An instruction pipeline in a computer processor improves instruction execution throughput by processing instructions using a number of pipeline stages, where multiple stages can act on different instructions of an instruction stream in parallel. A conditional branch instruction in an instruction stream may result in a pipeline stall if the processor waits until the conditional branch instruction is resolved in an execution stage in the pipeline before fetching the next instruction in an instruction fetching stage for the pipeline. A branch predictor may attempt to guess whether a conditional branch will be taken or not. Rather than stall when a branch is encountered, a pipelined processor uses branch prediction to speculatively fetch and execute instructions along the predicted path. Branch prediction is used to assist in the flow of executing instructions.

SUMMARY

According to an embodiment, a computer-implemented method for caching of perceptron branch patterns using ternary content addressable memory (TCAM) is provided. The computer-implemented method includes defining a table of perceptrons, each perceptron having a plurality of weights with each weight being associated with a bit location in a history vector, and defining a TCAM, the TCAM having a number of entries, wherein each entry includes a number of bit pairs, the number of bit pairs being equal to a number of weights for each associated perceptron. The computer-implemented method also includes associating the TCAM with an array of x-bit saturating counters including a first bit indicating a confidence, a second bit indicating a direction prediction for each entry, a third bit indicating a qualified entry bit, and a fourth bit indicating a tag for identifying branch patterns, and performing a branch prediction for a history vector of a given branch, the branch prediction indicating a perceptron prediction. The computer-implemented method includes determining a most influential bit location in the history vector, the most influential bit location having the greatest weight of an associated perceptron.

According to a different embodiment, a system for caching of perceptron branch patterns using ternary content addressable memory (TCAM) is provided. The system includes a storage medium, the storage medium being coupled to a processor, the processor configured to define a table of perceptrons, each perceptron having a plurality of weights with each weight being associated with a bit location in a history vector, and define a TCAM, the TCAM comprising a number of entries, wherein each entry includes a number of bit pairs, the bit pairs being equal to a number of weights for each associated perceptron. The system also includes the processor being configured to associate the TCAM with an array of x-bit saturating counters including a first bit indicating a confidence, a second bit indicating a direction prediction for each entry, a third bit for indicating a qualification bit, and a fourth bit indicating a tag for identifying branch patterns, and perform a branch prediction for a history vector of a given branch, the branch prediction indicating a perceptron prediction. The system includes the processor being configured to determine a most influential bit location in the history vector, the most influential bit location having the greatest weight of an associated perceptron.

According to another embodiment, a computer program product for caching of perceptron branch patterns using ternary content addressable memory (TCAM) is provided. The computer program product includes a computer readable storage medium having stored thereon first program instructions executable by a processor to cause the processor to define a table of perceptrons, each perceptron having a plurality of weights with each weight being associated with a bit location in a history vector, and define a TCAM, the TCAM having a number of entries, wherein each entry includes a number of bit pairs, the bit pairs being equal to a number weights for each associated perceptron. The computer program product includes instructions to cause the processor to associate the TCAM with an array of x-bit saturating counters including a first bit indicating a confidence, a second bit indicating a direction prediction for each entry, a third bit indicating a qualification bit, and a fourth bit indicating a tag for identifying branch patterns, and perform a branch prediction for a history vector of a given branch, the branch prediction indicating a perceptron prediction. The computer program product includes instructions to cause the processor to determine a most influential bit location in the history vector, the most influential bit location having the greatest weight of an associated perceptron.

BRIEF DESCRIPTION OF THE DRAWINGS

FIG. 3A and FIG. 3B provide a perceptron entry in accordance with an embodiment;

DETAILED DESCRIPTION

Figure 1:
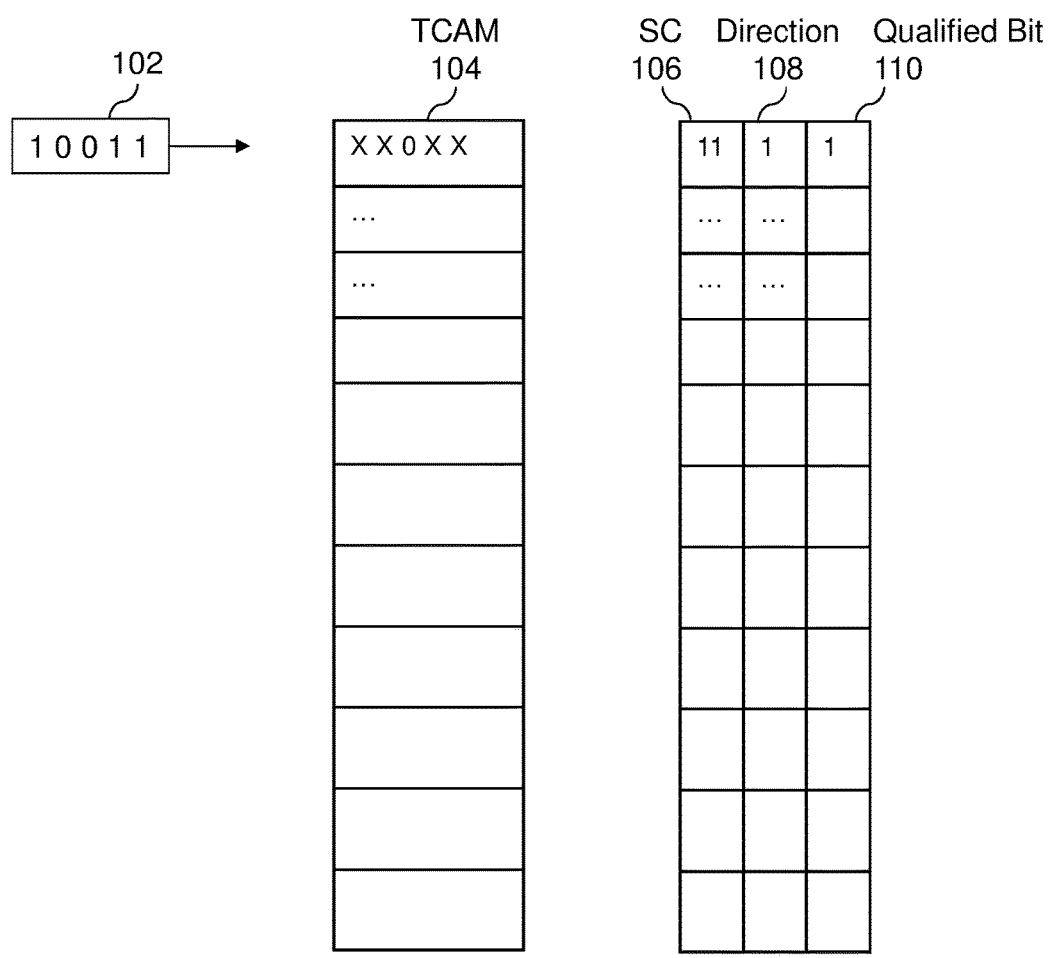
FIG. 1 provides a data structure used in accordance with an embodiment.

The technique described herein provides upon detecting a confident perceptron setting, saving the pattern into a data structure that can look up this pattern for branch prediction to be used in a subsequent search. The technique provided limits the amount of computation required for each prediction which refers to the TCAM, requires storing fewer bits for the stored content, and enables the analysis of other patterns with higher coverage as confident patterns are removed from the perceptron.

A branch predictor may also include branch target prediction, which attempts to guess a target of a taken conditional or unconditional branch before it is computed by decoding and executing the instruction itself. A branch target may be a computed address based on an offset and/or an indirect reference through a register. A throughput penalty is incurred if a branch is mispredicted.

A branch target buffer (BTB) can be used to predict the target of a predicted taken branch instruction based on the address of the branch instruction. Predicting the target of the branch instruction can prevent pipeline stalls by not waiting for the branch instruction to reach the execution stage of the pipeline to compute the branch target address. By performing branch target prediction, the branch's target instruction decode may be performed as early as the same cycle or the cycle after the branch instruction instead of having multiple bubble/empty cycles between the branch instruction and the target of the predicted taken branch instruction. Other branch prediction components that may be included in the BTB or implemented separately include a branch history table and a pattern history table. A branch history table can predict the direction of a branch (taken vs. not taken) as a function of the branch address. A pattern history table can assist with direction prediction of a branch as a function of the pattern of branches encountered leading up to the given branch which is to be predicted. The pattern of branches is used for indexing the table and this index may consist solely of the branch pattern or it may be a function of other knowledge such as an XOR hashing of the branch address itself. The branch pattern may be a pattern of taken (T)/not taken (NT) knowledge, a representation of an instruction address bit(s) of the last X taken branches, or something else. Branch patterns are defined as being "local" or "global". A local pattern with regard to a branch at instruction address (IA) 'Y' represents past (prior iterations) knowledge of the branch at IA 'Y' only. Global history involves knowledge of the last 'Z' qualified branches leading up to the branch at IA 'Y'. All branches leading up to branch at IA 'Y' may be deemed as qualified or only a subset of those branches leading up to the branch may be qualified as per example of only leveraging taken branches in the pattern. Patterns referenced in the examples are of global history; however, one skilled in the art could leverage local history patterns.

Perceptron branch predictors are simple artificial neural networks that predict a branch's direction by learning correlations between bits in a history vector and the branch outcome using a plurality of weights. This typically requires storing signed integer weights for each bit in the history vector. Perceptron branch predictors provide highly accurate predictions but are expensive in terms of silicon area required to store the weights and expensive in terms of area and cycle time to compute the prediction.

By removing the tracking of a branch's highly predictable outcome associated with a specific history pattern from a perceptron table, the perceptron is allowed to process predictions for other patterns more efficiently with greater coverage. In one or more embodiments, system designs can support 16-128 entries, each entry having between 64-512 bits. As the pattern is removed from the perceptron, the data is stored in the TCAM reducing the computation required by the perceptron. Using the TCAM, as opposed to a CAM, precise matches are no longer required as the TCAM stores three different states, the 0, 1, and "don't care (x)" state. The technique described herein relies on the combination of a perceptron and a TCAM for caching perceptron branches for performing branch predictions.

FIG. 1 depicts a content addressable memory 100 in accordance with an embodiment. In order to predict an outcome of a given branch as "taken" or "not taken," sequences of branches leading up to the given branch are observed and captured in a history vector. For example, a 5-bit history vector (1 0 0 1 1) indicates the five preceding branches of the given branch were taken, not taken, not taken, taken, taken. The history vector is also referred to as a global history as it is a history of a multitude of branches, as per the branch IAs, leading up to the branch of interest for prediction. The left most 1 of 1 0 0 1 1 represents the oldest branch in the history and the right most 1 represents the youngest/most recently branch in the history. As new branches are added to the 5-bit history vector, the vector is shifted left where the oldest branch is removed from the history vector and the newest branch is added to the right.

The global history 102 is used to search into the memory 104. In one or more embodiments, memory 104 is a TCAM, wherein the TCAM includes a plurality of entries. The first entry in the TCAM only requires the third bit from the left to match not taken "0" state as the remaining bits are in the "don't care" state. In accordance with an embodiment, a precise match of all of the bits of the global history is not required. A saturating counter 106 provides an example 2-bit saturating counter for each entry. In this embodiment, the 2-bits indicate strength of the confidence of the accuracy of an associated pattern. The accuracy of the pattern is based on the number of times the prediction for the pattern being correct. The strength of the confidence can be incremented and decremented based on the predictions. The prediction direction 108 provides whether the prediction for the global history 102 was taken "1" or not taken "0." In this example, the bit "1" indicates the prediction for a branch having the global history 102 is "taken," and the bit "0" indicates the prediction for the branch is "not taken." In one or more embodiments, a saturating counter can use 4 or more bits to indicate the confidence. The direction bit 108 provides the direction. A qualified entry bit 110 is used to indicate the TCAM is used to make the prediction. In an embodiment, the qualified entry bit 110 is used when no longer in the learning phase as the confidence for an entry has reached the threshold level.

The TCAM determines a pattern match exists, but it is not used to determine if this pattern branch is for the branch at a particular IA or not. To accomplish determining whether the pattern is for the branch at a particular IA, a match against the IA may also be performed. In one or more embodiments, a content addressable memory (CAM) can be provided in parallel to the TCAM 104. In this configuration the CAM stores the instruction address (IA) of the branch of interest. In order for a match to be returned, the CAM and TCAM must return a match.

Figure 2:
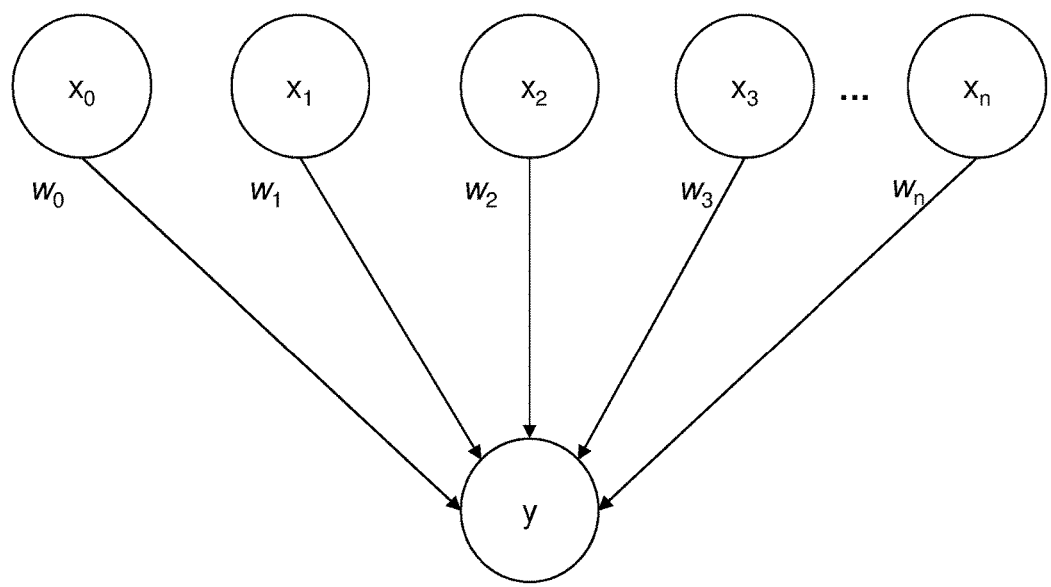
FIG. 2 provides a perceptron used in accordance with an embodiment.

Referring now to FIG. 2 a perceptron 200 used in accordance with an embodiment is shown. FIG. 2 provides the computation required for processing a perceptron. As the global history for a given branch increases, the computation required for prediction increases as the number of branches and weights increase.

The perceptron 200 includes a number of inputs (x's) from branch history and indicate either (−1) or (+1). A (+1) indicates that a branch was taken and (−1) indicates that a branch was not taken. The (n+1) small integer weights (w) are learned by on-line training. Output (y) is a dot product of x's and w's. If the output y is greater than or equal to 0, the prediction for the given branch is that it should be taken. The training process finds correlations between the branch history (global history) and the outcome. When making a prediction, the sign determines the direction (e.g. positive is taken and negative is not taken) and the magnitude of the strength specifies a confidence. In an embodiment, the taken state is represented by the bit "1" and not taken can be represented by the bit "0."

For example, take a global history of a given branch having a 5-bit history of 1 0 0 1 1 (i.e. Taken, Not taken, Not taken, Taken, Taken), and allow the perceptron values to be (1, 4), (0, 5), (1, 6), (0, 3), (1, 2). Working from left to right of the history the analysis provides:

(1, 4): agree with taken at a weight of 4==>1*1*4=4 (taken, agree with, weight);

(0, 5): disagree with not taken at a weight of 5==>-1*-1*5=5;

(1, 6): agree with not taken at a weight of 6==>1*-1*6=-6;

(0, 3): disagree with taken at a weight of 3==>-1*1*3=-3; and (1, 2): agree with taken at a weight of 2==>1*1*2=2.

The sum of the values provides: (4)+(5)+(-6)+(-3)+2=positive 2. Therefore the perceptron predicts the given branch should be "taken" with low confidence because the summation is a positive number having a low magnitude.

In accordance with an embodiment, over time as a given pattern shows strong prediction accuracy for a given branch, the pattern is stored in a TCAM entry having a correlated saturating counter (confident) and direction prediction (taken).

Response to a perceptron entry being moved over to the TCAM, it is moved over as a partial move. First, one branch of correlation is moved and subsequently more branches are moved if needed. As such, the TCAM saturating counter begins at a very low confidence (i.e. 0 or 1). In an embodiment, some designs use the 0 state as an invalid entry and 1 as the lowest confidence of a valid entry. In a different embodiment, some designs use 0 as the lowest confidence and use an independent valid bit for the entry.

In one or more embodiments, the weights can be represented as signed integers using 2's complement notation. Each weight having a signed integer with positive values (sign bit=0) indicates a positive correlation with the history bit and negative values (sign bit=1) indicates a negative correlation with the history bit. In the example provided above, the five-bit history (1 0 0 1 1) converts to (+1 −1 −1 +1 +1) having perceptron values of +4, −5, +6, −3, +2, respectively. The summation of the values provide (1×4)+(−1×−5)+(−1×6)+(1×−3)+(1×2)=2. The result of the computation provides the same result as above where the prediction is "taken" with a low confidence based on the low magnitude.

Referring now to FIG. 3A, a single entry perceptron table 300A is provided. Perceptron 300 provides an example of a 16 entry table for tracking 16 prior branches leading up to a given branch (x). An optional tag is provided for indicating a branch of an instruction address that will be tracked. For example, 12 bits of an instruction address ranging from bits 52-63 can be indicated in the tag. In total there are 124 bits (12+(16*(6+1))) used to define the prediction of a branch at a single IA (in the event a plurality of branches with IA's 52:63 share the same address, they are hashed into this same entry). The perceptron 300 also illustrates a sign bit is used for agree or disagree and a 6-bit weight is used to indicate the strength of the agree or disagree statement.

FIG. 3B provides a multiple entry perceptron in accordance with one or more embodiments. In one or more embodiments, tags are used for multiple perceptron entries that are tracking multiple branches. In this example, four perceptron entries are provided. Bit 63 of an instruction address is shown as being associated with "0" state and bit 63 is also shown as being associated with a "1" state. A tag is shown indicating bits 51-62 and is used to determine which of the two branches for an instruction address of a given branch x is selected based on bit 63 being a function being either a "0" or a "1." A tag match is performed on bits 51-62 of the instruction address of x to determine whether there is a match for the perceptrons. The tag is used to determine if a perceptron entry for the given branch even exists for the tag. In this manner, the number of tag compares is limited to two tag compares instead of four. Therefore as the perceptron grows there would only need to be two tag compares, instead of 32 tag compares for the 32 entries made up of 16 congruence classes.

Figure 4:
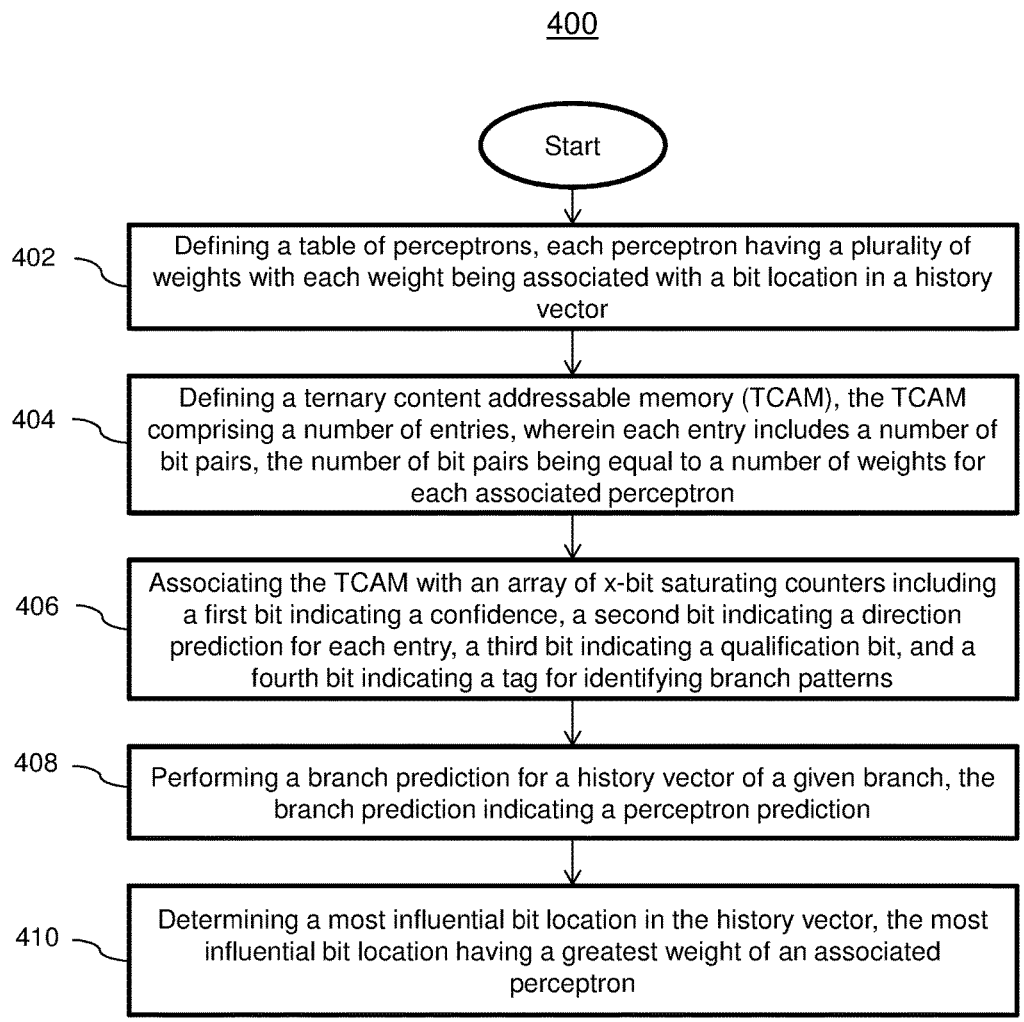
FIG. 4 provides a flow chart for a method of caching perceptron branch patterns using ternary content addressable memory in accordance with another embodiment.

Now referring to FIG. 4 a flow chart 400 for a method for using a ternary content addressable memory (TCAM) for caching perceptron branches is provided. Block 402 provides defining a table of perceptrons, each perceptron having a plurality of weights with each weight being associated with a bit location in a history vector. In one or more embodiments, the history vector can represent a global and/or local branch history. In another embodiment, the history vector can be a direction history vector (taken vs not-taken) or a path-based vector with information associated with each taken branch in the history. As shown in FIGS. 3A and 3B an example of a perceptron is provided. In one or more embodiments, one having ordinary skill in the art will appreciate the perceptron can be replaced with any predication mechanism, wherein a unique confidence weight is provided respectively for a plurality of branches. Other known prediction mechanisms are considered within the scope of the disclosure.

Block 404 provides defining a TCAM, the TCAM comprising a number of entries, a number of bit pairs for each entry being equal to a number of the corresponding weights of the perceptron. For a single TCAM entry, each entry comprises a number of bits where each bit pair represents the states 0, 1, X. As shown in FIG. 1, the entry in TCAM 104 represents five bit pairs for a perceptron having five weights. In an example a perceptron having five weights defines a TCAM having five bit pair entries. Block 406 provides associating the TCAM with an array of x-bit saturating counters including a first bit indicating a confidence, a second bit indicating a direction prediction for each entry, a third bit indicating a qualification bit, and a fourth bit indicating a tag for identifying branch patterns. In one or more embodiments, the saturating counter is an x-bit array wherein one of ordinary skill in the art can optimize the number of x bits used in the array for each application. In an embodiment, when installing a new branch into the TCAM an entry can be selected by various methods. One method includes using an LRU or pseudo LRU algorithm against the TCAM. Another technique implements a round robin scheme for installing new branches into the TCAM. In one or more embodiments, the fourth bit indicating a tag for identifying branch patterns can associate the optional tag and tag of FIG. 3A and FIG. 3B, respectively.

Block 408 provides performing a branch prediction for a history vector of a given branch, the branch prediction indicating a perceptron prediction. In one or more embodiments, the global history is a vector indicating the previous branches that were taken and not taken leading up to the given branch. In an embodiment, various techniques can be used for branch predictions. For example, branch history tables, pattern history tables, and tables of perceptrons can be used for branch predictions as previously described. Other known techniques can also be used for branch predictions. In one or more embodiments, a tag can be associated with the prediction indicating that a perceptron prediction is associated with the branch of interest per a tag match.

Block 410 provides determining a most influential bit location in the history vector, the most influential bit location having the greatest weight of the perceptron. In an embodiment, the branches of the global history are analyzed to determine the most influential branch. An entry is added to the TCAM and the most influential branch is denoted in the TCAM. The direction of the most influential branch is determined by the direction of the previous branch of a corresponding branch in the global history. A corresponding branch of the most influential branch is a bit in the same position in the TCAM entry and the global history. The other bits of the TCAM entry are set to the "don't care" state. In an event, where there are two or more influential branches exhibiting the same weight, different solutions are available. One solution provides taking one and only one branch and leverages the youngest branch where the selection is performed from right to left. Another solution provides taking the multiple tied branches for the entry in the TCAM.

Figure 5:
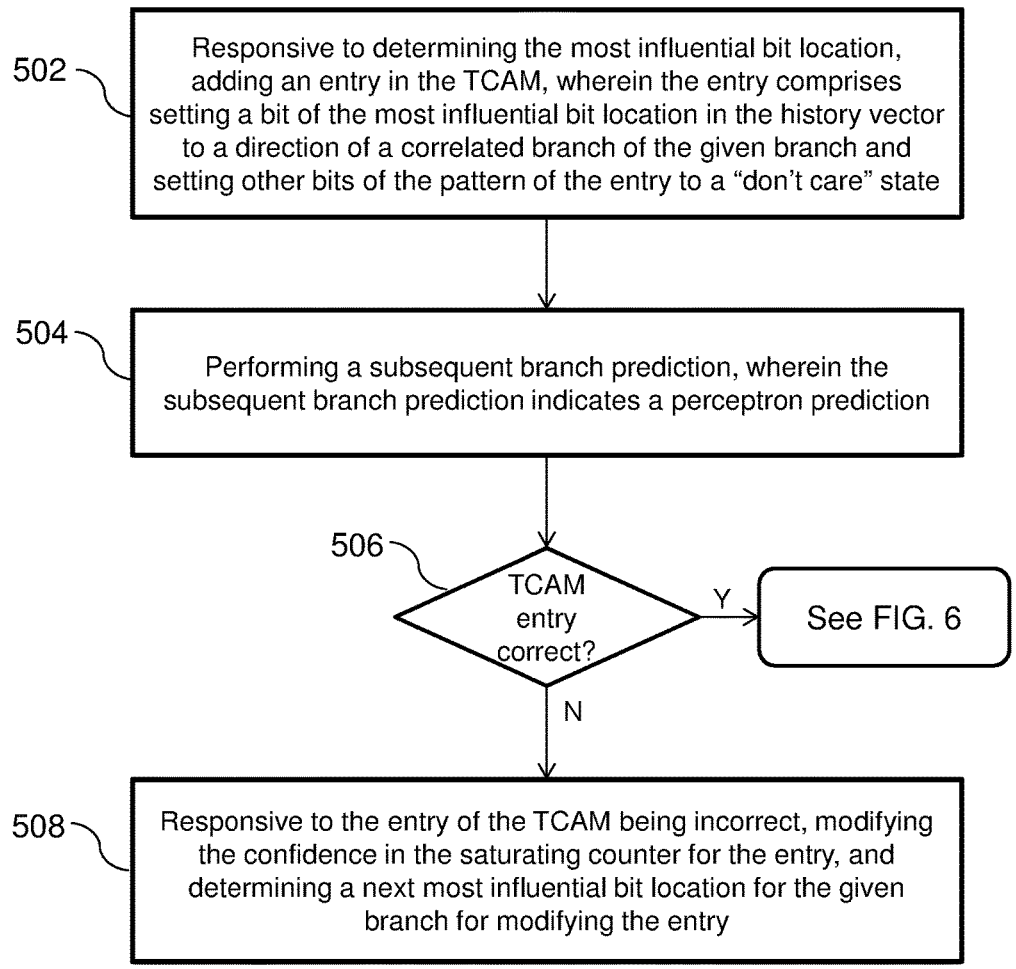
FIG. 5 provides a flow chart for a method of caching perceptron branch patterns using ternary content addressable memory in accordance with another embodiment.

Referring now to FIG. 5, a method 500 for using a TCAM for caching perceptron branches is provided. Block 502 provides responsive to determining the most influential branch of the given branch, adding an entry in the TCAM, wherein the entry comprises setting a bit of the most influential branch to a direction of a correlated branch of the given branch and setting other bits of the pattern to "don't care" state.

Block 504 provides performing a subsequent branch prediction, wherein the subsequent branch prediction indicates a perceptron prediction. In one or more embodiments, a tag is used to indicate a perceptron prediction is available for branch prediction. In one or more embodiments, a perceptron prediction having a tag match can select the perceptron prediction over a PHT prediction being available but in a weak state, and/or a number of other options that are used to select a perceptron prediction is to be leveraged. Block 506 provides determining whether a TCAM entry is correct. The TCAM makes a prediction and must be compared against a value to determine if the TCAM entry prediction is correct. There are different options for performing the comparison. In a first option, the TCAM prediction is compared against that of the perceptron when in a learning phase. A second option includes comparing the TCAM prediction to the branch outcome. Once the TCAM learns a pattern, and the perceptron no longer has an associated prediction, the comparison of the TCAM prediction is against the resolved branch outcome. In an embodiment, the TCAM prediction for the entry is compared to the perceptron prediction to determine the correctness of the TCAM entry. In a different embodiment where a different prediction mechanism is used, the TCAM entry is compared to an associated entry in the prediction mechanism.

In the event the TCAM entry is not correct, processing continues to block 508. Block 508 provides responsive to the TCAM entry being incorrect, resetting the confidence in the saturating counter for the entry, and determining a next most influential weight for the given branch. In another embodiment, responsive to determining the TCAM entry is incorrect, one having ordinary skill in the art may decide not to reset the counter but instead, decrement the confidence value, divide the confidence value by 2, or implement some other means of reduction.

In an embodiment, after determining the TCAM entry is incorrect, the confidence for the entry is reset to 0. Also, the second most influential branch is determined to update the TCAM entry. From the example above for the 5-bit global history the second most influential branch from the perceptron having the greatest weight is the second leftmost bit. From the perceptron, the second branch was indicated as (0, 5) (not taken, weight of 5). In this example, the two branches having the greatest influence for the prediction are considered. The TCAM entry is updated from "X X 0 X X" to "X 0 0 X X" where two branches are now being considered. In one or more embodiments, if a subsequent prediction for the TCAM entry is incorrect the third most influential branch can be determined and the confidence indicated in the saturating counter can be reset. In the event, the subsequent predictions are incorrect in the TCAM the next most influential bits of the global history will be added to the TCAM.

In the event there is more than one perceptron entry or having a plurality of TCAM entries that represent more than a single perceptron entry/tag, a mechanism must be used to associate such. One method includes using a tag match. The tag can be implemented in a parallel content addressable memory (CAM) structure to perform the address match, similar to how an address match is performed on a perceptron. In one or more embodiments, the TCAM/CAM can be configured to be fully associative while other embodiments may utilize a level of associativity by splitting the CAM up into regions. For example, similar to that of a perceptron, the associativity needs to be greater to handle the amount of patterns that may be exhibited for any one region of CAM access.

Figure 6:
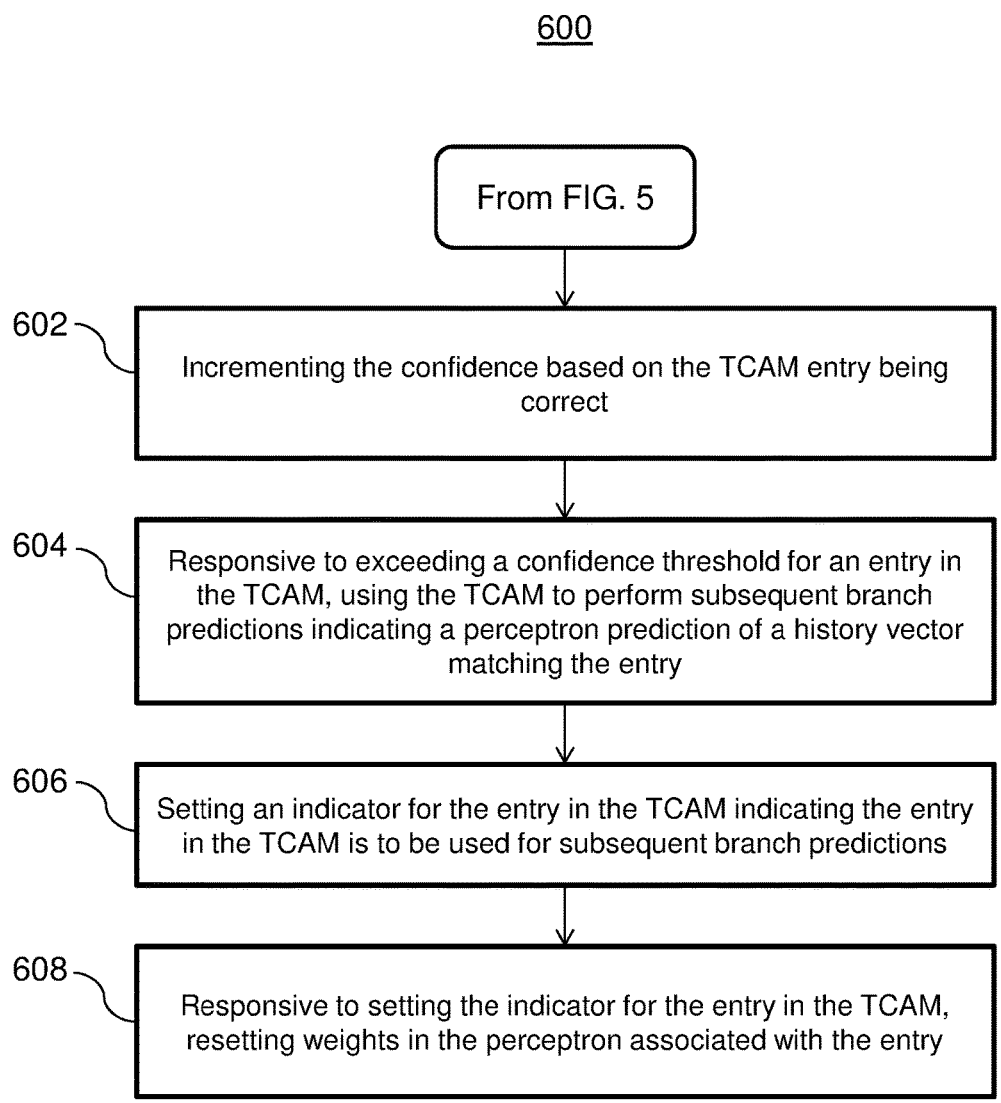
FIG. 6 provides a flow chart for a method of caching perceptron branch patterns using ternary content addressable memory in accordance with an embodiment.

Referring now to FIG. 6, a flow chart 600 of a method for using a TCAM for caching perceptron branches is provided. Responsive to determining the TCAM entry is correct, block 602 provides incrementing the confidence based on the TCAM entry being correct. In one or more embodiments, when the TCAM confidence for an entry reaches a configurable threshold level, a state can be set in the TCAM indicating the TCAM is enabled to perform predictions and is subsequently used for predictions. In one or more embodiments, when the TCAM is no longer in the training phase, it can provide or influence the direction of the branch prediction. When in the training phase, the TCAM includes predictions but is compared to another outcome and does not apply the predicted direction for the given branch. A qualification entry bit can be used to indicate this state in the TCAM.

Referring to the example above the 5-bit global history for a given branch is 1 0 0 1 1. After performing the perceptron prediction, the TCAM is searched to determine whether there is an existing entry associated with the 5-bit global history. The search reveals a matching entry X X 0 X X, where the entry is only concerned with the third rightmost bit indicating the third branch back of the corresponding branch in the global history was "not taken." The other bit values for global history are disregarded as the wild-card value indicates a "don't care" state in the associated TCAM entry. The perceptron entry from the example above reveals the prediction for the given branch (x) indicates the branch is taken with low confidence. The TCAM entry indicates for this entry having the third bit set to 0 (not-taken) the branch prediction is set to taken. Because the TCAM prediction entry for this given branch matches the perceptron prediction for this entry, the confidence for this entry is increased. In one or more embodiments, the confidence strength for the entry is increased in the saturating counter table.

Block 604 provides responsive to exceeding a confidence threshold for an entry in the TCAM, using the TCAM to perform subsequent branch predictions indicating a perceptron prediction. In one or more embodiments, a scenario can arise when a branch no longer has an existing perceptron entry in the perceptron table while the branch has one or more TCAM entries. In one example, all perceptron predictions can be moved into TCAM entries such that there is a TCAM prediction for a given branch where there is no longer a perceptron entry for the given branch. In this scenario, the TCAM entry can be used for the prediction. In one or more embodiments, a configurable threshold for the confidence threshold is used to indicate when a history vector is no longer required to be leveraged to adjust weights against a pattern which is tracked by the perceptron. The TCAM can be used for predicting the outcome of a pattern for a given branch. Once the TCAM entry gets above a certain strength the TCAM will be used for the prediction, and the perceptron entry for the pattern will be ignored. By avoiding the use of the perceptron for an associated entry stored in the TCAM, the computation required for each perceptron prediction is reduced.

In an embodiment, as more and more predictions are executed and the confidence of a prediction, the correlation between the TCAM entry and the outcome become more reliable. As the confidence threshold is exceeded, the perceptron prediction will no longer be used, thus conserving computing resources and the TCAM will be relied upon for future predictions when global histories and branch IAs match a TCAM entry. In one or more embodiments, the weights of the perceptron are zeroed out, with respect to the past branches which are referenced by the TCAM upon the TCAM reaching a confidence that qualifies it to be leveraged over being in the training mode, and are made available for processing other patterns and branches.

When the TCAM causes specific weights in a perceptron entry to be zeroed out, if all the weights become zero or all the weights then drop below a certain threshold for a given entry in the perceptron when the perceptron is not in a training mode, the perceptron entry may be moved from most recently used MRU to least recently used LRU memory location as it is likely that the perceptron is no longer being leveraged with value.

Block 606 provides setting an indicator in the TCAM indicating the TCAM is to be used for subsequent branch predictions indicating the perceptron prediction for a global history matching the TCAM entry. In an embodiment, the indicator is a bit associated with an entry in the TCAM where different types of predictions can be used such as BHT, PHT, and perceptrons. A subsequent prediction for a global history of a given branch indicating that the perceptron is to be used, the indicator causes the system to use the TCAM for the prediction and not the perceptron in the event a pattern match in the TCAM and IA match as per reference of the CAM addition. In one or more embodiments, if a TCAM entry is in a training mode and a perceptron is no longer tracked in the perceptron table, training cannot continue. In a different embodiment, if the TCAM is no longer in training mode and the qualification bit is set to '1' indicating it is a valid entry for making predictions, the existence of the perceptron entry in the perceptron table is irrelevant. If the TCAM entry exists and includes the qualified bit, it can be used to make the prediction.

Block 608 provides responsive to setting the indicator for the entry in the TCAM, resetting weights in the perceptron associated with the entry. In one or more embodiments, the perceptron is no longer required to store data associated with the TCAM entry freeing up resources and reducing the computation required by the system. In another embodiment, the weights in the perceptron table associated with an entry that has been added to the TCAM having a confidence that exceeds a threshold are reset. For example, referring to the previous example the second and third branch in the pattern will be zero'd out. The zero valued weights may be remapped to consider impacts of one or more earlier branches prior to the respective branches to increase prediction confidence.

Figure 7:
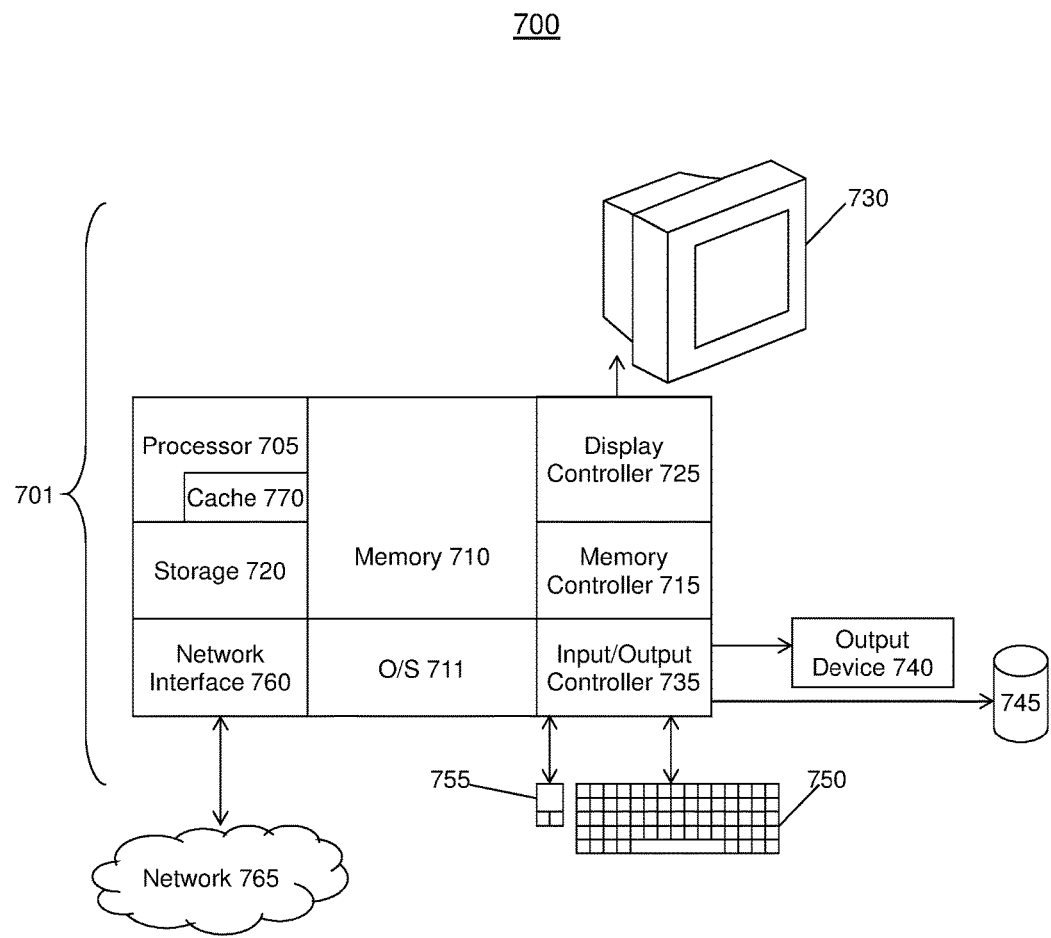
FIG. 7 is a block diagram illustrating an example processing system for practice of the teachings herein.

In an exemplary embodiment, in terms of hardware architecture, as shown in FIG. 7, the computer 701 includes a processor 705. The computer 701 further includes memory 710 coupled to a memory controller 715, and one or more input and/or output (I/O) devices 740, 745 (or peripherals) that are communicatively coupled via a local input/output controller 735. The input/output controller 735 can be, for example but not limited to, one or more buses or other wired or wireless connections, as is known in the art. The input/output controller 735 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 705 is a hardware device for executing software, particularly that stored in storage 720, such as cache storage, or memory 710. The processor 705 can be any custom made or commercially available processor, a central processing unit (CPU), an auxiliary processor among several processors associated with the computer 701, a semiconductor based microprocessor (in the form of a microchip or chip set), a macroprocessor, or generally any device for executing instructions. In one or more embodiments of the invention, the processor 705 can be coupled to a cache 770.

The memory 710 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 710 may incorporate electronic, magnetic, optical, and/or other types of storage media. Note that the memory 710 can have a distributed architecture, where various components are situated remote from one another, but can be accessed by the processor 705.

The instructions in memory 710 may include one or more separate programs, each of which comprises an ordered listing of executable instructions for implementing logical functions. In the example of FIG. 9, the instructions in the memory 710 a suitable operating system (OS) 711. The operating system 711 essentially controls the execution of other computer programs and provides scheduling, input-output control, file and data management, memory management, and communication control and related services.

In an exemplary embodiment, a conventional keyboard 750 and mouse 755 can be coupled to the input/output controller 735. Other output devices such as the I/O devices 740, 745 may include input devices, for example but not limited to a printer, a scanner, microphone, and the like. Finally, the I/O devices 740, 745 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 700 can further include a display controller 725 coupled to a display 730. In an exemplary embodiment, the system 700 can further include a network interface 760 for coupling to a network 765. The network 765 can be an IP-based network for communication between the computer 701 and any external server, client and the like via a broadband connection. The network 765 transmits and receives data between the computer 701 and external systems. In an exemplary embodiment, network 765 can be a managed IP network administered by a service provider. The network 765 may be implemented in a wireless fashion, e.g., using wireless protocols and technologies, such as WiFi, WiMax, etc. The network 765 can also be a packet-switched network such as a local area network, wide area network, metropolitan area network, Internet network, or other similar type of network environment. The network 765 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 701 is a PC, workstation, intelligent device or the like, the instructions in the memory 710 may further include a basic input output system (BIOS) (omitted for simplicity). The BIOS is a set of essential software routines that initialize and test hardware at startup, start the OS 711, and support the transfer of data among the hardware devices. The BIOS is stored in ROM so that the BIOS can be executed when the computer 701 is activated.

When the computer 701 is in operation, the processor 705 is configured to fetch and execute instructions stored within the memory 710, to communicate data to and from the memory 710, and to generally control operations of the computer 701 pursuant to the instructions.

In an exemplary embodiment, where the branch prediction is implemented in hardware, the methods described herein, such as processes 400, 500, and 600 of FIGS. 4, 5, and 6, can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Technical effects and benefits include achieving increased branch prediction accuracy by extending an effective length of a history vector without adding corresponding weights via virtualization mapping. Embodiments can further increase processing efficiency by incorporating virtualized weights and selected history bits in an adder tree. Additional efficiency can be achieved by incorporating a confidence threshold into the adder tree.

It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

What is claimed is:

1. A computer-implemented method for caching of perceptron branch patterns using ternary content addressable memory (TCAM) the computer-implemented method comprising:
    defining a table of perceptrons, each perceptron having a plurality of weights with each weight being associated with a bit location in a history vector;
    defining a TCAM, the TCAM comprising a number of entries, wherein each entry includes a number of bit pairs, the number of bit pairs being equal to a number of weights for each associated perceptron;
    associating the TCAM with an array of x-bit saturating counters including for each entry a first bit indicating a confidence, a second bit indicating a direction prediction for each entry, a third bit indicating a qualification bit, and a fourth bit indicating a tag for identifying branch patterns, wherein the x-bit saturating counters comprise four or more bits;
    performing a branch prediction for a history vector of a given branch, the branch prediction requiring a perceptron prediction; and
    determining a most influential bit location in the history vector of the given branch, the most influential bit location having a greatest weight of an associated perceptron;
    responsive to determining the most influential bit location, adding an entry in the TCAM, wherein the added entry comprises a bit of the most influential bit location that is set to a direction of a correlated branch of the history vector of the given branch and other bits of the added entry that are set to a "don't care" state.

2. The computer-implemented method of claim 1, further comprising performing a subsequent branch prediction, wherein the subsequent branch prediction indicates a perceptron prediction; and
    determining if a subsequent entry exists in the TCAM for the subsequent branch prediction.

3. The computer-implemented method of claim 2, further comprising responsive to determining the subsequent entry exists in the TCAM, determining whether the subsequent entry is correct, based on a comparison of the subsequent entry and at least one of a perceptron prediction for the given branch and a resolution direction of the given branch; and incrementing a confidence in the saturating counter for the subsequent entry.

4. The computer-implemented method of claim 3, responsive to the subsequent entry of the TCAM being incorrect, modifying the confidence for the subsequent entry in the saturating counter; and
determining a next most influential bit location in the history vector of the given branch;
updating the subsequent entry in the TCAM, setting a bit for the next most influential bit location in the TCAM to the direction of a corresponding branch of the history vector.

5. The computer-implemented method of claim 4, responsive to exceeding a confidence threshold for the subsequent entry in the TCAM, using the TCAM to perform subsequent branch predictions indicating a perceptron prediction for a history vector matching the subsequent entry.

6. The computer-implemented method of claim 5, further comprising setting an indicator for the subsequent entry in the TCAM indicating the subsequent entry in the TCAM is to be used for subsequent predictions.

7. The computer-implemented method of claim 6, further comprising responsive to the TCAM making an incorrect prediction for the subsequent entry and a confidence for the subsequent entry exceeding a confidence threshold, continuing to use the TCAM for subsequent branch predictions for the subsequent entry and decrementing the confidence in the saturating counter for the subsequent entry.

8. The computer-implemented method of claim 6, further comprising responsive to setting the indicator for the subsequent entry in the TCAM, resetting weights in the perceptron associated with the subsequent entry.

9. A system for caching of perceptron branch patterns using ternary content addressable memory (TCAM), the system comprising:
one or more processors; and
at least one memory, the memory including instructions that, upon execution by at least one of the one or more processors, cause the system to perform a method for analyzing and prioritizing incoming user messages, wherein the method comprises:
defining a table of perceptrons, each perceptron having a plurality of weights with each weight being associated with a bit location in a history vector;
defining a ternary content addressable memory (TCAM), the TCAM comprising a number of entries, wherein each entry includes a number of bit pairs, the number of bit pairs being equal to a number of weights for each associated perceptron;
associating the TCAM with an array of x-bit saturating counters including a first bit indicating a confidence, a second bit indicating a direction prediction for each entry, a third bit indicating a qualification bit, and a fourth bit indicating a tag for identifying branch patterns, wherein the x-bit saturating counters comprise four or more bits;
performing a branch prediction for a history vector of a given branch, the branch prediction indicating a perceptron prediction; and
determining a most influential bit location in the history vector of the given branch, the most influential bit location having a greatest weight of an associated perceptron;
responsive to determining the most influential bit location in the history vector of the given branch, adding an entry in the TCAM, wherein the added entry comprises a bit of the most influential bit location that is set to a direction of a correlated branch of the history vector of the given branch and other bits of the added entry that are set to a "don't care" state.

10. The system of claim 9, further comprising performing a subsequent branch prediction, wherein the subsequent branch prediction indicates a perceptron prediction; and
determining if a subsequent entry exists in the TCAM for the subsequent branch prediction.

11. The system of claim 10, further comprising responsive to determining the subsequent entry exists in the TCAM, determining whether the subsequent entry is correct, based on a pattern of the subsequent prediction and a prediction of the perceptron for the given branch; and
incrementing a confidence in the saturating counter for the subsequent entry.

12. The system of claim 11, responsive to the subsequent entry of the TCAM being incorrect, modifying the confidence for the subsequent entry in the saturating counter; and
determining a next most influential bit location of the history vector of the given branch;
updating the subsequent entry in the TCAM, setting a bit for the next most influential bit location in the TCAM to the direction of a corresponding branch of the history vector of the given branch.

13. The system of claim 12, responsive to exceeding a confidence threshold for the subsequent entry in the TCAM, using the TCAM to perform subsequent branch predictions indicating a perceptron prediction for a history vector matching the subsequent entry.

14. A computer program product for caching of perceptron branch patterns using ternary content addressable memory (TCAM), the computer program product comprising:
a computer readable storage medium having stored thereon first program instructions executable by a processor to cause the processor to:
define a table of perceptrons, each perceptron having a plurality of weights with each weight being associated with a bit location in a history vector;
define a TCAM, the TCAM comprising a number of entries, wherein each entry includes a number of bit pairs, the number of bit pairs being equal to a number of weights for each associated perceptron;
associate the TCAM with an array of x-bit saturating counters including a first bit indicating a confidence, a second bit indicating a direction prediction for each entry, a third bit indicating a qualification bit, and a fourth bit indicating a tag for identifying branch patterns, wherein the x-bit saturating counters comprise four or more bits;
perform a branch prediction for a history vector of a given branch, the branch prediction requiring a perceptron prediction; and
determine a most influential bit location in the history vector of the given branch, the most influential bit location having a greatest weight of an associated perceptron;
responsive to determining the most influential bit location, add an entry in the TCAM, wherein the added entry comprises a bit of the most influential bit location that is set to a direction of a correlated branch of the history vector of the given branch and other bits of the added entry that are set to a "don't care" state.

15. The computer program product of claim 14, wherein the instructions are further executable by a processor to cause the processor to perform a subsequent branch prediction, wherein the subsequent branch prediction indicates a perceptron prediction; and
    determining if a subsequent entry exists in the TCAM for the subsequent branch prediction.

16. The computer program product of claim 15, wherein the instructions are further executable by a processor to cause the processor to be responsive to determining the subsequent entry exists in the TCAM, determine whether the subsequent entry is correct, based on a pattern of the subsequent prediction and a prediction of the perceptron for the given branch; and
    incrementing a confidence in the saturating counter for the subsequent entry.

17. The computer program product of claim 16, wherein the instructions are further executable by a processor to cause the processor to be responsive to the subsequent entry of the TCAM being incorrect, modify the confidence for the subsequent entry in the saturating counter;
    determine a next most influential bit location in the history vector of the given branch;
    updating the subsequent entry in the TCAM, setting a bit for the next most influential bit location in the TCAM to the direction of a corresponding branch of the history vector of the given branch; and
    responsive to exceeding a confidence threshold for a subsequent entry in the TCAM, using the TCAM to perform subsequent branch predictions indicating a perceptron prediction for a history vector of the given branch matching the subsequent entry.

\* \* \* \* \*